C. M. BARTHOLOMEW.
VEHICLE WHEEL.
APPLICATION FILED FEB. 16, 1914.
1,151,238.
Patented Aug. 24, 1915.
2 SHEETS—SHEET 1.
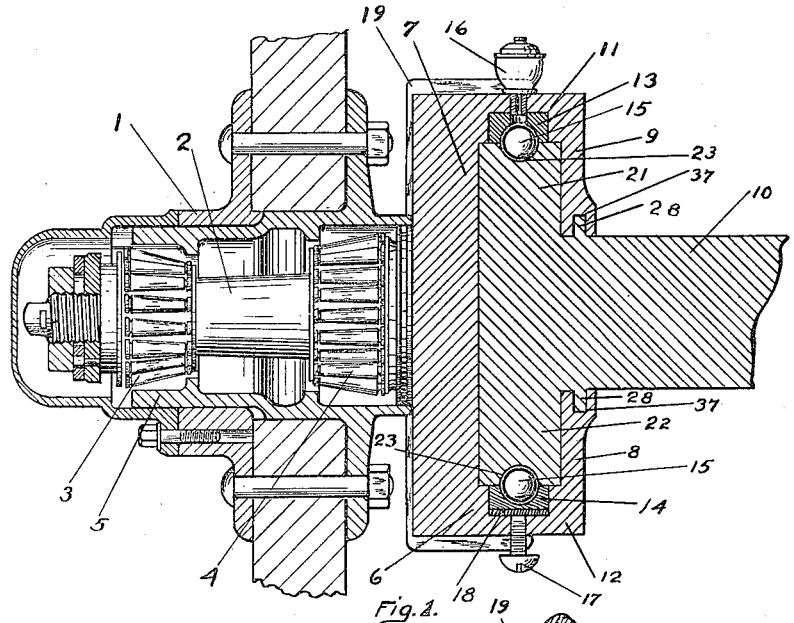
Fig. 1.
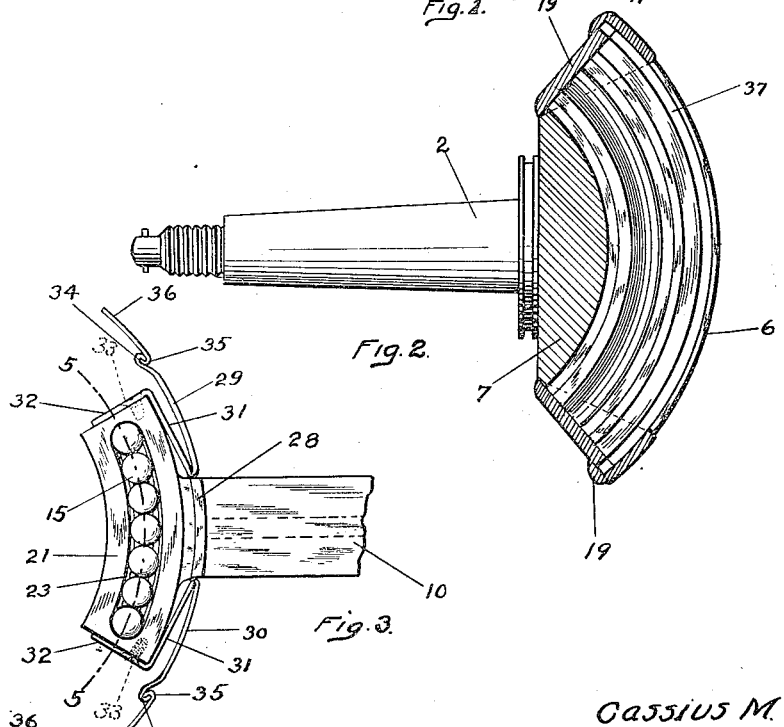
Fig. 2.
Fig. 3.
Inventor
Cassius M. Bartholomew
Witnesses
Geo. E. Kricker Jr.
A. L. Phelps
By
C. C. Shepherd Attorney

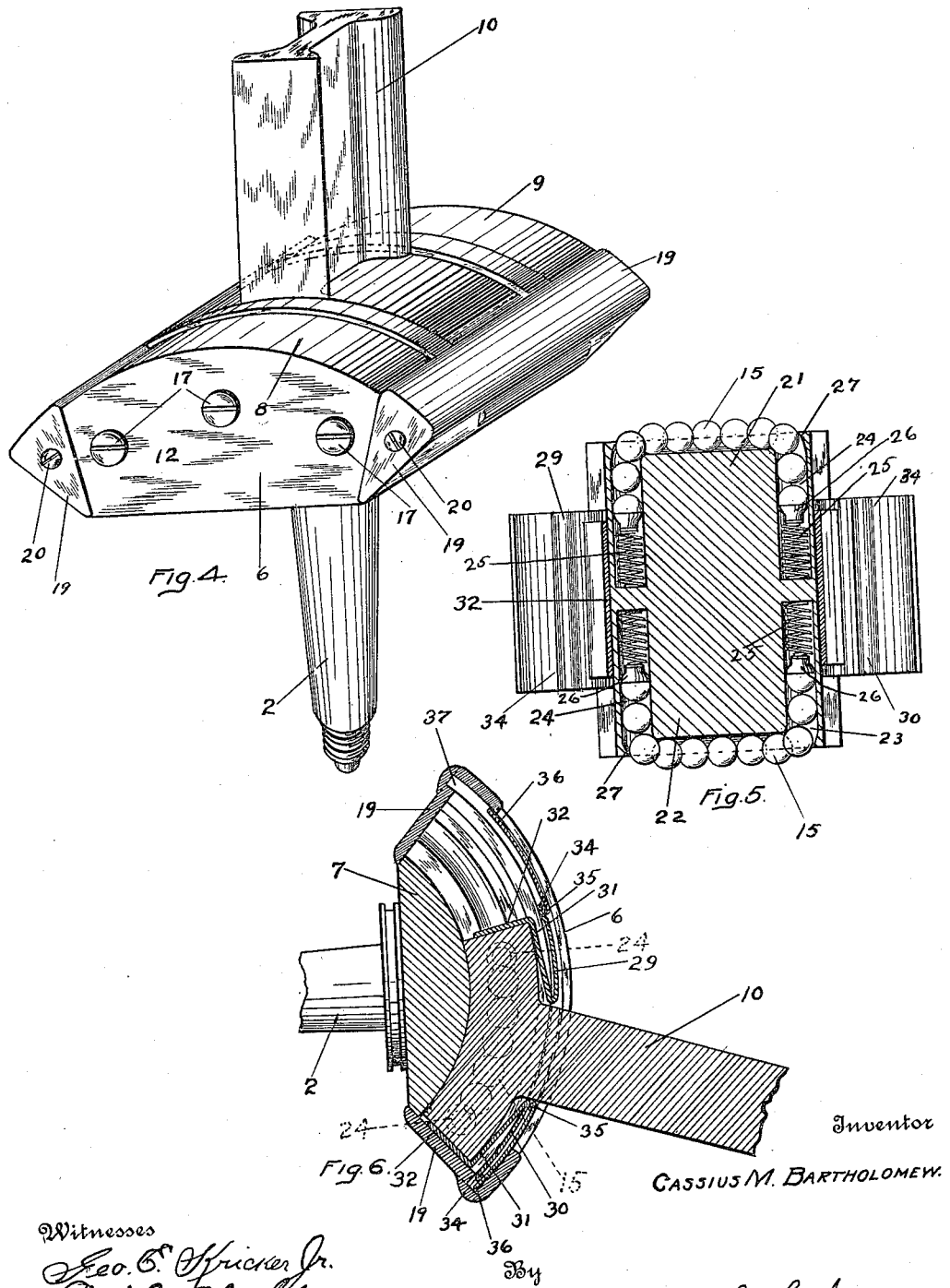

UNITED STATES PATENT OFFICE.

CASSIUS M. BARTHOLOMEW, OF COLUMBUS, OHIO, ASSIGNOR OF ONE-THIRD TO HENRY D. BARTHOLOMEW, OF NEWARK, OHIO.

VEHICLE-WHEEL.

1,151,238. Specification of Letters Patent. Patented Aug. 24, 1915.

Application filed February 16, 1914. Serial No. 818,885.

*To all whom it may concern:*

Be it known that I, CASSIUS M. BARTHOLOMEW, a citizen of the United States, residing at Columbus, in the county of Franklin and State of Ohio, have invented certain new and useful Improvements in Vehicle-Wheels, of which the following is a specification.

My invention relates to vehicle wheels and more particularly to that type of vehicle wheel in which the center of oscillation for steering purposes, is carried in the center of the axle and in a plane passing centrally through the wheel as a whole. This type of steering connection has been found to be very desirable, for the reason that the shock caused by a wheel striking an obstruction, does not tend to oscillate the wheel further. In other words, where the center of oscillation is outside of the wheel and the wheel strikes an obstruction, the natural tendency will be for it to move about its point of oscillation whereas if this point is within the hub structure itself, the center of rotation and the center of oscillation are in the same point. I aim to provide a structure of wheel of this type in which the moving parts are all protected against the entrance of dirt and grit to prevent wear during its normal operation. I also aim to provide a novel type of bearing structure in order that the wheel itself may be oscillated with comparative ease.

The novel features of the specific structure used by me, will become more apparent after a further detailed description of the accompanying drawings, in which similar characters of reference designate corresponding parts, and in which:

Figure 1 is a central vertical section of my invention, showing the major portion of the wheel broken away, Fig. 2 is a horizontal section through the casing member carried by the spindle of the wheel and with the internal structure removed, Fig. 3 is a plan view of the structure removed from Fig. 2, Fig. 4 is a view in perspective showing my invention assembled, Fig. 5 is a section taken on the curved line 5—5 of Fig. 3, and, Fig. 6 is a horizontal section through my invention, showing the parts in one extreme position of movement.

In the drawings, I have shown a portion of a wheel whose hub structure is designated in its entirety by the reference numeral 1, which hub structure is rotatable about a spindle 2. Inasmuch as the particular type of internal construction of the wheel is not new, wherever I may refer to a spindle, I mean such structure as either permits the rotation of a wheel thereon, as the front wheel of an ordinary automobile, or a structure by which the wheel is actually driven, such as the rear wheel. In Fig. 1, suitable roller bearings 3 and 4 are shown as being mounted upon this spindle, which roller bearings coöperate with the hub casing 5 to permit rotation of the wheel as a whole. The spindle 2 rigidly carries a sectoral casing 6, which casing is formed with a closed or solid rear wall 7 and a slotted front wall, this front wall being formed by the upstanding flange 8 and a downwardly extending flange 9. These flanges 8 and 9 extend toward the main axle 10 of the vehicle a distance to permit its free movement laterally during the normal steering operation. The top and bottom walls 11 and 12 thus formed, are each provided with removable race members 13 and 14 respectively, these race members being provided with ways to coöperate with the bearing balls 15. I have also shown a grease cup 16 as being in communication with the upper raceway, but the oiling feature may be taken care of in any desired manner. The lower race member 14 is adjustable vertically to adjust the distance between the two race members, this adjustment being effected by the provision of a plurality of screws 17 threaded into the lower wall 12 and bearing against a follower member shown at 18. The sectoral casing 6 has its center in the center of the wheel and is normally constructed so that its vertical ends are open, but held closed by the provision of end caps 19 held in position by screws 20 or other suitable attaching means. It will thus be apparent that this sectoral casing is closed on all sides with the exception of the slotted opening in its front wall, the interior of this casing being adapted to house the upwardly and downwardly extending arms 21 and 22 integrally formed upon the ends of the axle 10. These arms 21 and 22 are also of a greater width than the width of the axle 10, but are not of a size to completely occupy the interior of the casing 6. Both the arms 21 and 22 are also provided with complemental raceways 23 into which the bearing balls 15 are adapted to seat themselves. These bearing balls are provided in order to reduce to a minimum the amount of force required to change the position of the wheel as regards steering and in order that these balls may not be forced against opposite walls of the raceways, I have provided each of the arms 21 and 22 with vertical chambers such as are shown at 24, these chambers communicating with the raceways 23. In the base of each of these chambers I have placed a spring 25, carrying an engaging head 26 at one end. As the wheel is oscillated as is done in steering, the balls are permitted to rotate about their own center and move longitudinally in the raceways. After they have reached the extreme end of their travel, they will be forced downwardly into one or the other of the chambers against the tension of the respective springs, while the springs upon the opposite sides will act in a complemental capacity to force an additional ball or two up to a position to perform its function. The outside ends of these channels or those ends which communicate with the raceways 23, are preferably formed of a nature to eliminate all play and to do this, I have found it desirable to initially bore the chamber 24 and to subsequently press a portion of metal into position to give the formation, such as is shown at 27.

In order that no dust or grit may enter the working parts of the steering connection, I have provided a peculiarly novel shield structure and have also provided the axle 10 with small outwardly projecting shoulders 28, these shoulders being concentric with the curvature of the interior of the casing and being adapted to slide in channels formed for this purpose in the ends of the flanges 8 and 9. The shield structure proper comprises plates 29 and 30, secured to the arm projections of the axle member 10 preferably by doubling one end back as is shown at 31 and then forming a right angular bend, such as is shown at 32, the latter end serving as the attaching end and held in position by screws 33. The opposite ends of these plate members 30, are crimped to form channels such as shown at 34, these channels being adapted to coöperate with hooks 35 formed upon one end of each of the complemental plate members 36. All of these plate members 30, 31 and 36 are of a height to conveniently slide in the channelways which engage the outwardly projecting lugs 28 and which are more clearly shown at 37 in Fig. 2. These plate members are also preferably of a resilient nature to at all times force them into their outermost position. The purpose of the jointed connection which is effected by the channels 34 and hooks 35, may be clearly illustrated in Fig. 6, in which the wheel is shown as being moved to one extreme position and in which case the plate member 36 has disengaged itself from the channel 34 and has slid over the top of the complemental plate member 30 to produce a result similar to that attained by telescoping parts. It will be understood that the inherent resiliency of these plates will be such that they will again come into engagement when the wheel is moved to the opposite extreme position.

From the foregoing description, it must be apparent that I have provided a type of steerable wheel in which the center of oscillation is located in the center of the wheel itself, the structure being such that the wheel must possess considerable rigidity and will stand the abuse met in actual use. Further, the provision of the peculiar type of bearing for the movable parts of the steering mechanism shown, is such that the power required will be reduced to a minimum. Further, the shield structure shown, will preclude the entrance of all dust and grit and, therefore, the life of my wheel is greatly increased over others.

What I claim, is:

1. A vehicle wheel comprising a hub portion, a spindle within said hub portion, a casing member carried by said spindle, a sectoral raceway formed in said casing, an axle, an arm member carried by said axle and adapted to operate in conjunction with said casing, a complemental sectoral raceway formed in said arm member, vertical chambers formed in one of said members and communicating with said raceways, and bearing balls in said raceways and adapted to enter said chambers when the wheel is turned for steering.

2. A vehicle wheel comprising a hub portion, a spindle within said hub portion, a casing carried by said spindle, sectoral raceways formed in the top and bottom of said casing, an axle, an arm member carried by said axle and adapted to coöperate with said casing, complemental raceways formed in said arm member, vertical chambers formed in said arm member and communicating with said raceways, a spring in the bottom of said chambers, and bearing balls fitting in said raceways and entering said chambers, said springs bearing on the balls and on the bottom of said chambers.

3. A vehicle wheel comprising a hub portion, a spindle within said hub portion, a sectoral casing having open ends and formed with a solid back wall and a front wall formed of upwardly and downwardly extending flanges, caps for said open ends, raceways in the top and bottom of said casing, means for vertically adjusting the distance between said raceways, an axle member, upwardly and downwardly extending arms on said axle, raceways formed in each of said arms, vertical chambers formed in each of said arms and communicating with said last-named raceways, springs in the bottom of each of said chambers, and bearing balls fitting in said raceways and entering said chambers, and springs bearing against the balls and on the bottom of said chambers.

4. A vehicle wheel comprising a hub portion, a spindle within said hub portion, a sectoral supporting member carried by said spindle, an axle, a complemental sectoral member carried by said axle, raceways formed in each of said members, bearing balls working in said raceways, one of said members being formed with vertical chambers communicating with said raceways, and springs in the base of said chambers, said balls being adapted to be forced into said chambers by relative movement between said members.

In testimony whereof I affix my signature in presence of two witnesses.

CASSIUS M. BARTHOLOMEW.

Witnesses:
WALTER E. L. BOCK,
A. L. PHELPS.

Copies of this patent may be obtained for five cents each, by addressing the "Commissioner of Patents, Washington, D. C."